Patented Nov. 3, 1925.

1,559,961

UNITED STATES PATENT OFFICE.

GILBERT E. SEIL AND OSCAR F. HEDENBURG, OF PITTSBURGH, PENNSYLVANIA, ASSIGNORS TO FRANK O. MOBURG, OF TOLEDO, OHIO, AND THE ROESSLER & HASSLACHER CHEMICAL COMPANY, A CORPORATION OF NEW YORK.

INSECTICIDE.

No Drawing.     Application filed May 28, 1921.    Serial No. 473,344.

*To all whom is may concern:*

Be it known that we, GILBERT E. SEIL and OSCAR F. HEDENBURG, citizens of the United States, residing at Pittsburgh, county of Allegheny, State of Pennsylvania, have invented certain new and useful Improvements in Insecticides; and we do hereby declare the following to be a full, clear, and exact description of the invention, such as will enable others skilled in the art to which it appertains, to make and use the same.

This invention relates to the improvements in insecticide compositions and the killing of insects therewith.

The insecticide compositions of the present invention are made by dissolving a cyanhydrin in water in such proportions that the resulting solution can be used as a poison in killing insects.

The cyanhydrins which are used, according to the present invention, are compounds formed by the reaction between hydrocyanic acid and organic compounds containing the carbonyl group, such as aliphatic or aromatic aldehydes or ketones, or formed by other reactions which give a compound with a hydroxyl group and a cyano (or nitrile) group on the same carbon atom.

The invention will be further illustrated by the following specific example: The cyanhydrin of acetone is diluted with water in the proportion of one part of cyanhydrin by volume to from 100 to 1000 parts of water, according to the nature of the foliage to be sprayed or insect to be killed. The solution thus produced is of appropriate strength for use as a poison for killing insects, for example, by using the solution as a spray. Such a solution possesses sufficient insecticidal properties for killing insects, such as aphides, cockroaches and bed bugs. The solution can be used either with or without the addition thereto of other ingredients, for example, ingredients such as soap, to promote the wetting property of the solution.

Instead of using the cyanhydrin of acetone, other cyanhydrins can be used in a similar manner, particularly those which have sufficient solubility in water to enable them to form solutions of appropriate strength for spraying purposes, and which have toxic properties. The insecticide compositions, made by compounding the cyanhydrins with water, have sufficient insecticidal properties to make them valuable as insecticides, in dilutions such as those above indicated Owing to the solubility of the cyanhydrins in water, and the resulting production of a homogeneous solution, the insecticide can readily be applied in a uniform manner by a spraying operation.

The insecticide composition can also be applied otherwise than by spraying, and can be used for other insecticidal purposes than the protection of foliage. So also, the degree of dilution of the solution of the cyanhydrins is capable of variation. Somewhat stronger solutions may thus be advantageously employed for killing insects, such as bugs and beetles, than for soft-bodied insects such as aphides.

We claim:

1. An insecticide composition comprising a dilute solution of a cyanhydrin, of appropriate strength for use for insecticidal purposes.

2. An insecticide composition comprising a dilute aqueous solution of a cyanhydrin in the proportion of one part cyanhydrin to one hundred or more parts of water.

3. An insecticide composition comprising a dilute aqueous solution of cyanhydrin of acetone in the proportion of one part cyanhydrin to one hundred or more parts of water.

In testimony whereof we affix our signatures.

OSCAR F. HEDENBURG.
GILBERT E. SEIL.